Dec. 7, 1965   P. U. REUSSER   3,222,553
ELECTROSTATIC GENERATOR
Filed Aug. 28, 1962
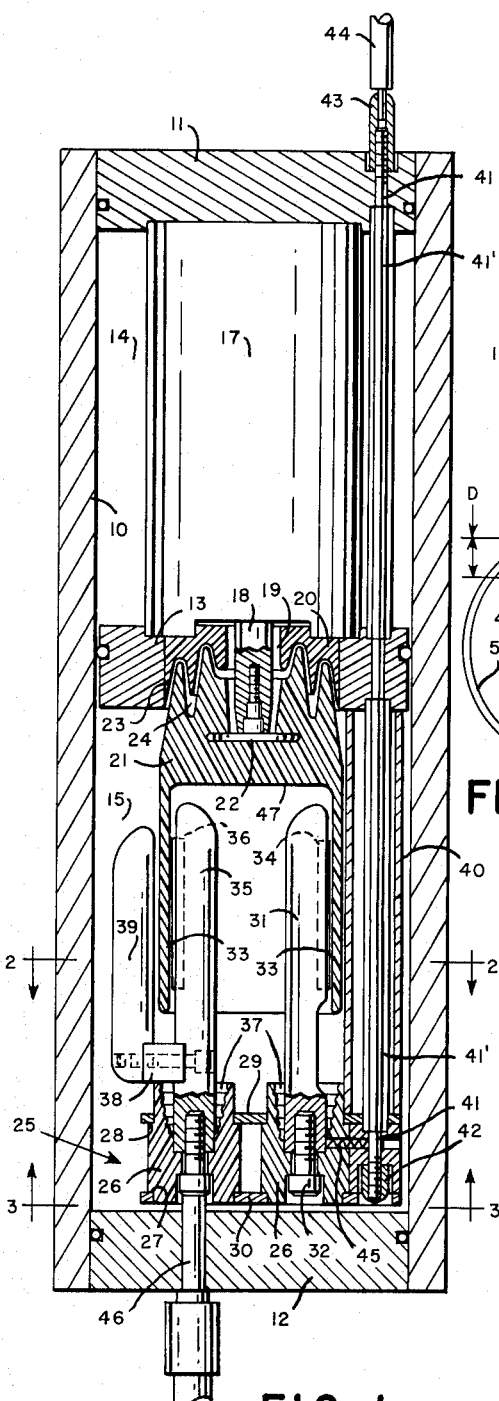
FIG. 1
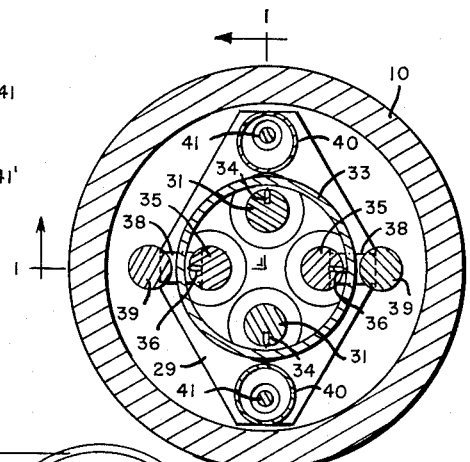
FIG. 2
FIG. 4.
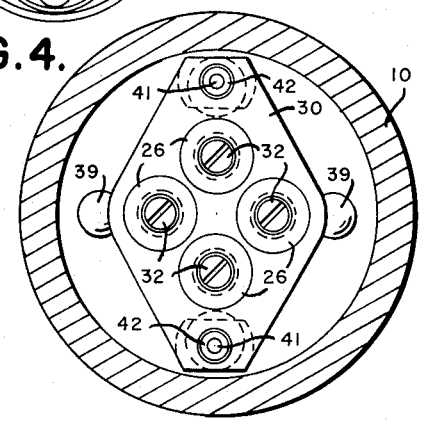
FIG. 3
INVENTOR.
PETER U. REUSSER
BY
ATTORNEY.

United States Patent Office 3,222,553
Patented Dec. 7, 1965

3,222,553
ELECTROSTATIC GENERATOR
Peter U. Reusser, Box 502, Ridgefield, Conn.
Filed Aug. 28, 1962, Ser. No. 219,863
7 Claims. (Cl. 310—6)

This invention relates to electrostatic generators and particularly to an improved electrostatic generator capable of producing extremely high output voltages within a minimum of space and weight.

The prior known Van der Graaf generator employs a belt as a charge carrier, and the tangential field is provided by means of a series of electrodes which are located in close proximity to the belt and lie in a plane parallel to the plane of the belt and in a direction at right angles to the movement of the belt. These electrodes are connected to a resistor chain, and beginning with the low voltage end of the chain, each of the succeedingly higher ones is at a higher potential than those below it. This arrangement of electrodes fails to give a uniform tangential field. Furthermore, the elongated belt that carries the charges is susceptible to vibrations at speeds required to produce the desired results. In order to insure reliable operation, the charge density of the belt must be kept very low to accommodate such variations and to avoid corona discharge.

Another form of known electrostatic generator employs a rotating rotor instead of a belt. This arrangement, of course, avoids the belt vibrations of the Van der Graaf generator. In this rotor arrangement, field uniformity is achieved by the use of arcuately formed semiconductors, i.e., solid semiconductive glass or suitable material having a semiconductive coating, located either inside or outside of the rotor. Difficulties have been experienced with known generators employing this type of rotor carrier in that it is extremely difficult to put a uniform semiconductive coating on any surface. Thickness variations of the coating create field variations which lower the average permissible voltage gradient. Such semiconductive coatings as well as the glass semiconductors can be broken through, leaving permanent field distortions.

The glass and semiconductive coatings are temperature-sensitive and if exposed to temperatures above about 80° C. to 100° C., they become conductors and render the generator useless. Additionally, the great difference between the coefficients of expansion of glass and plastics, the building materials commonly used, leads to practical mechanical difficulties. Furthermore, the interface between a metal inductor and semiconductive solids or coatings, or between a semiconductive inductor and a solid dielectric gives rise to an uneven tangential rotor field which lowers the output current and voltage. In the present embodiment of the invention, the term "electrode" shall mean an electrode inside a rotor that transports charges therebetween; and the term "inductor" shall mean an electrode on the outside of said rotor.

The principal object of this invention is to provide an electrostatic generator capable of producing extremely high voltage outputs within a minimum of space and still having great stability of operation within wide temperature ranges.

Still another object of the invention is to provide such a generator in which the spacing of the axes of the high and low voltage electrodes relative to their diameters follows an equation that produces an optimum field intensity between the two.

Another object of the invention is to provide such a generator in which several high and low voltage electrode pairs are employed.

Still another object of the invention is to provide such a generator in which the design of the electrodes as well as that of the dielectric elements are such that minimum field intensity is created between electrodes or points of opposite polarity.

Another object of the invention is to provide such a generator which is capable of operating at the lowest possible electric field for a given voltage in the dielectric medium surrounding the operating parts of the generator, so that the highest voltage output can be obtained.

In one aspect of the invention, a hermetically sealed envelope may be filled with hydrogen under about 240 p.s.i. This hydrogen pressure produces a dielectric strength of about 500–600 volts/mil and is the factor which determines the output characteristics of a generator of a predetermined size. Other media may be hermetically sealed within the envelope, such as helium, vapors or liquids, either pressurized or unpressurized, and even a vacuum may be employed.

In another aspect of the invention, an intermediate partition may be located in the envelope and it may have passages therethrough for establishing communication between all portions of the envelope. A motor may be mounted between one end of the envelope and the intermediate partition, and an inverted, cup-shaped rotor made from a dielectric material may be attached to the motor shaft for rotation therewith.

In still another aspect of the invention, spaced, alternate high and low voltage electrodes having cross sections of substantially the same dimensions may be mounted in a base member of dielectric material, which latter may be held in fixed relation to the intermediate partition and on the side thereof opposite the motor by spacing means which may comprise hollow inductors at ground potential. The grounded inductors may be parallel to, radially aligned with, and very closely spaced to the low voltage electrodes, the rim of the rotor being located within said close space. An inductor may be directly connected to each of the high voltage electrodes, and it may be spaced and aligned in the manner of the grounded, hollow inductors with the rim of the rotor passing within the close space therebetween.

In still another aspect of the invention, knife edges may be provided in each of the high and low voltage electrodes for producing a corona effect between them and the peripheral surface of the rotor.

It has been found, and can be mathematically established, that an optimum condition providing maximum voltage output within minimum space for a given hydrogen pressure dielectric can be achieved between a cross sectional dimension of the high and low voltage electrodes and the spacing of their axes. This optimum condition produces a minimum and smooth field density between the high and low voltage electrodes so that the maximum voltage output can be achieved relative to the dielectric strength of the hydrogen pressure within the envelope. In the embodiments disclosed, the cross section of the electrodes is circular so that their cross sectional dimensions are diameters. The relationship relative to such embodiments is:

$$\frac{\text{Distance of electrode axes}}{\text{Electrode diameter}} = \frac{\text{Range of 1.25 to 6.8}}{1}$$

Preferably the value on the righthand side of the equation is 2.44.

Therefore, another aspect of the invention is to provide such a generator in which the spacing between the high and low voltage electrode axes is to the diameter of said electrodes as the range between about 1.25 to 6.8 is to 1.

In still another aspect of the invention, there is provided such a generator in which the spacing of the high and low voltage electrode axes is to the diameter of said electrodes as 2.44 is to 1.

Another aspect of the invention involves an electrostatic generator in which the grounded inductor is the exterior envelope for the generator, and the spacing of the electrodes preferably should follow the above formula. It has been found that an optimum uniform field condition can be obtained between the high voltage inductor and the nearest element of lower potential (envelope casing) if the distance between the nearest point on each is the product of a cross sectional dimension (radius, if circular) of the high voltage inductor and a value within the range of 0.25 to 5.8, and preferably 1.60.

The above, other objects and novel features of the invention will become apparent from the following specification and accompanying drawing which is merely exemplary.

In the drawing:

FIG. 1 is a sectional elevational view taken substantially along line 1—1 of FIG. 2, and showing an electrostatic generator to which the principles of the invention have been applied;

FIG. 2 is a sectional view taken substantially along line 2—2 of FIG. 1;

FIG. 3 is a sectional view taken substantially along line 3—3 of FIG. 1; and

FIG. 4 is a schematic view of a modified form of the invention.

Referring to the drawing, the principles of the invention are shown as applied to an electrostatic generator including an envelope 10 which may be made of aluminum or other suitable material. The envelope 10 may include hermetically sealed ends 11 and 12. A partition 13, preferably made of dielectric material such as a plastic, e.g., epoxy resin, may be mounted within the envelope 10, dividing it into chambers 14 and 15 that are in communication with each other as will be explained later.

An electric motor 17 may be supported between the end plate 11 and the intermediate partition 13 with its output shaft 18 extending through a through passage 19 in a plug 20 that is shown as separate from the partition 13 for convenience of manufacture. However, the plug 20 preferably is cemented in place to avoid any direct leakage paths to the motor 17. The shaft 18 may have fixed to it a thin-walled, cup-shaped rotor 21 which also is made from a dielectric material such as one of the plastics. Although the rotor 21 is shown in the embodiment described as being of a hollow, cylindrical form, it may take other shapes such as being of a hollow, hyperboloid shape, conical, or the equivalent. The rotor 21 may have a threaded screw 22 embedded in its base portion that connects the rotor to shaft 18. In order to increase the length of electrical leakage path between the interior of chamber 15 and the metal shaft 18 and screw 22, a sort of labyrinth arrangement is provided between the plug 20 and the base of rotor 21. This seal may comprise concentric grooves 23 and 24 formed in the plug 20 and rotor 21, so that the ridges formed by those on plug 20 fit within the grooves formed in the rotor 21. Of course, all sharp points and corners are provided with as large a radius as is consistent with the design limitations imposed in order to reduce to a minimum any tendency to develop a corona effect therefrom.

An electrode and inductor supporting member 25 may comprise a plurality of spool-like members 26 made from an epoxy resin, ceramic material, or the like. The members 26 may include shoulders 27 and 28. Dielectric sheets 29 and 30 having holes therein are adapted to abut the shoulders 27 and 28 and to be glued or otherwise securely fastened to members 26 forming with them the base 25.

A low voltage electrode 31, which is shown as having a solid cylindrical construction, may be made of aluminum, stainless steel, carbon, or other conductive or semiconductive materials. It may be mounted within one of the members 26 by a screw 32. The exterior surface of the electrode 31 is highly polished and it extends along the inner surface of a skirt portion 33 of the rotor 21 in closely spaced relation. A knife edge 34 may be mounted in the electrode 31 such that its edge is spaced very closely to the inner surface of the skirt 33.

A high voltage electrode 35 of construction similar to that of electrode 31 and including a knife edge 36 may be mounted in another member 26 very close to the inner periphery of rotor skirt 33 and spaced along a diameter of the rotor 21.

The electrodes 31 and 35 are mounted within pockets 37 in members 26, and the surfaces of these pockets surrounding the electrodes may be corrugated to provide a maximum length of leakage path between the two electrodes. The electrode 35 has connected to it by a bar or arm 38, an inductor 39 that is parallel to and radially aligned with electrode 35 and which is very closely spaced from the exterior surface of the rotor skirt 33. Inductor 39 may be substantially of the same construction as electrode 35.

A grounded inductor 40, which is shown in the embodiment disclosed as a hollow cylindrical member, may be made of the same material as electrode 31 and it may be parallel to and radially spaced from the electrode 31 and closely spaced relative to the outer surface of skirt 33.

Referring to FIG. 2, there may be other electrodes 31, 35 and inductors 39, 40 spaced about the rotor skirt 33, and in the embodiment disclosed in FIGS. 1, 2 and 3, two pairs of low and high voltage electrodes and inductors, respectively, are shown. Tie rods 41 may extend longitudinally through the hollow inductors 40 and through the end cap 11 as well as through the base 25. These rods may be insulated with respect to members 40 and motor 17 by an insulating sleeve 41'. Nuts 42 and 43 at each end of rods 41 clamp the base 25 to the partition 13, with the inductors 40 acting as spacers. The tie rods 41 may be connected to an input cable 44 supplying relatively low voltage direct current of a desired polarity to the generator, for instance, in the order of about 20 to 30 kv., although this can be widely varied. A passage extending transversely through the members 26 that support the electrodes 31 may house a spring 45, between rods 41 and electrodes 31, supplying them with the low excitation voltage. A high voltage lead 46 may be connected to electrodes 35 and lead to the load to be supplied with high voltage.

The envelope 10 is preferably filled with hydrogen under a pressure in the vicinity of about 240 p.s.i., providing a dielectric strength of the medium within envelope 10 of about 500–600 volts per mil. It may, however, be filled with other gases, vapors and/or liquids, either pressurized or unpressurized, and even a vacuum may be employed.

As the rotor 21 rotates at a high rate in the order of about 12,000 r.p.m., the charges forced onto the knife edges 34 develop a strong electrostatic field between them and the grounded inductors 40 which are at a polarity opposite that of electrodes 31. Consequently, the charges on electrodes 31 move toward inductors 40 but are intercepted by the dielectric skirt 33 of rotor 21. Accordingly, these charges are transported to the vicinity of knife edges 36 and since the inductors 39 are of the same polarity as that of electrodes 35, the charges on the dielectric skirt 33 are forced off it through knife edges 36 into electrodes 35, thence through terminal 46 to the load.

In order to provide a sufficient volume of pressure hydrogen between the electrodes 31, 35 and the inside surface 47 of rotor 21, their upper ends preferably are spaced from surface 47 an amount at least equal to the radius of the electrodes. Furthermore, in order to reduce to a minimum the tendency to charge the inactive portion of the rotor with charges coming from the high voltage inductor 39, the upper end of inductor 39 is substantially lower or nearer the base 25 than the upper end of electrode 35.

In order to reduce the electrostatic field between electrodes 31 and 35, their upper ends include compound spheroid surfaces involving a large and small radius. The larger of the two radii of the compound surfaces is greater than the radius of the electrodes and forms the facing surfaces of the electrodes 31 and 35; whereas the other radii of the compound surfaces are less than the radius of the electrodes. This arrangement reduces to a minimum the field intensity between the upper ends of the electrodes 31 and 35.

Referring to FIG. 4, the principles of the invention are shown as applied to a single pair of high and low voltage electrodes 47, 48 within a rotor 49. These electrodes preferably are spaced from each other in the same manner as electrodes 31 and 35 are spaced. A high voltage inductor 50 is connected to electrode 47 in the same way inductor 39 is connected to electrode 35. In the embodiment of FIG. 4, the grounded or low voltage inductor comprises the generator envelope 51. For optimum field conditions, the distance D between the nearest points of inductors 50 and 51 relative to the radius $R_E$ of the inductor 50 preferably should be in the order of the product of $R_E$ and a value within the range of 0.25 to 5.8; and preferably should be about $1.60 \times R_E$.

Although the various features of the improved electrostatic generator have been shown and described in detail to fully disclose one embodiment of the invention, it will be evident that changes may be made in such details without departing from the principles of the invention. For example, although the low and high voltage electrodes 31 and 35 have been described as being within the interior of rotor 21 and the grounded inductors 40 as being exterior of rotor 21, the reverse could with facility be adopted with the knife edges 34 mounted on the inductors 39 and 40 exteriorly of the rotors 21 and 49, employing another form of spacer between base 25 and partition 13. Furthermore, although the form of the grounded or high voltage inductors is shown as cylindrical, they could with equal facility have a concave or convex surface in the areas of nearest proximity to the skirt 33 of rotor 21.

What is claimed is:

1. A high voltage electrostatic generator comprising in combination, a rotor of dielectric material; a plurality of electrodes having cross sections of substantially the same dimensions, and upper end portions of a compound spheroidal shape including curved surfaces on said electrodes that face each other having a radius greater than a cross sectional dimension of said electrodes; means for mounting said electrodes with a dielectric therebetween, and spaced from each other a distance in relation to a cross sectional dimension of said electrodes such that a minimum field strength exists within said dielectric between said electrodes; means for mounting said rotor so that its peripheral surface moves tangentially relative to a surface of said electrodes; means for applying charges of a predetermined polarity to said rotor at one of said electrodes; and means for removing said charges from said rotor at another electrode.

2. A high voltage electrostatic generator comprising in combination, an inverted cup-shaped rotor of dielectric material; a plurality of diametrically disposed, alternately arranged electrodes having cross sections of substantially the same dimensions, and upper end portions of a compound spheroidal shape including curved surfaces on said electrodes that face opposite electrodes having a radius greater than a cross sectional dimension of said electrodes; means for mounting said electrodes with a dielectric therebetween, spaced from each other a distance in relation to a cross sectional dimension of said electrodes such that a minimum field strength exists within said dielectric between the alternately arranged electrodes, and the upper ends of said electrodes spaced from the bottom of said cup-shaped rotor an amount equal to at least a cross sectional dimension of said electrodes; means for mounting said rotor so that its peripheral surface moves tangentially relative to a surface of said electrodes; means for applying charges of a predetermined polarity to said rotor at one of said electrodes; and means for removing said charges from said rotor at the next alternate of said electrodes.

3. A high voltage electrostatic generator comprising in combination, a rotor of dielectric material; a plurality of electrodes having cross sections of substantially the same dimensions; means for mounting said electrodes with a dielectric therebetween, the axes of said electrodes being spaced from each other an amount equal to the product of the maximum cross sectional dimension of the electrodes and a value within the range of 1.25 to 6.8; means for mounting said rotor so that its peripheral surface moves tangentially relative to a surface of said electrodes; means for applying charges of a predetermined polarity to said rotor at one of said electrodes; and means for removing said charges from said rotor at another electrode.

4. A high voltage electrostatic generator comprising in combination, a rotor of dielectric material; a plurality of electrodes having cross sections of substantially the same dimensions; means for mounting said electrodes with a dielectric therebetween, the axes of said electrodes being spaced from each other an amount equal to the product of the maximum cross sectional dimension of the electrodes and 2.44; means for mounting said rotor so that its peripheral surface moves tangentially relative to a surface of said electrodes; means for applying charges of a predetermined polarity to said rotor at one of said electrodes; and means for removing said charges from said rotor at another electrode.

5. A high voltage electrostatic generator comprising in combination, a rotor of dielectric material; a plurality of electrodes having substantially the same cross sectional dimensions, at least one of said electrodes being a high voltage electrode; an inductor conductively connected to said high voltage electrode so as to be of the same potential; means for mounting said electrodes with a pressurized gaseous medium therebetween, and spaced from each other a distance in relation to a cross sectional dimension of said electrodes such that a minimum field strength exists within said pressurized gaseous medium between said electrodes; means for mounting said rotor so that its peripheral surface moves tangentially relative to a surface of said electrodes; means for applying charges of a predetermined polarity to said rotor at one of said electrodes; and means for removing said charges from said rotor at another electrode, the construction and arrangement of the parts being such that the space between the nearest points on said high voltage inductor and an element of low potential is substantially equal to the product of a cross sectional dimension of said high voltage inductor and a value within the range of 0.25 to 5.8.

6. A high voltage electrostatic generator comprising in combination, a rotor of dielectric material; a plurality of electrodes having substantially the same cross sectional dimensions, at least one of said electrodes being a high voltage electrode; an inductor conductively connected to said high voltage electrode so as to be of the same potential; means for mounting said electrodes with a dielectric therebetween, the axes of said electrodes being spaced from each other an amount equal to the product of a cross sectional dimension of the electrodes and a value within the range of 1.25 to 6.8; means for mounting said rotor so that its peripheral surface moves tangentially relative to a surface of said electrodes; means for applying charges of a predetermined polarity to said rotor at one of said electrodes; and means for removing said charges from said rotor at another electrode, the construction and arrangement of the parts being such that the space between the nearest points on said high voltage inductor and an element of low potential is substantially equal to the product of a cross sectional dimension of said high voltage inductor and a value within the range of 0.25 to 5.8.

7. A high voltage electrostatic generator comprising in combination, a rotor of dielectric material; a plurality of electrodes having substantially the same cross sectional dimensions, at least one of said electrodes being a high voltage electrode; an inductor conductively connected to said high voltage electrode so as to be of the same potential; means for mounting said electrodes with a dielectric therebetween, and spaced from each other a distance in relation to a cross sectional dimension of said electrodes such that a minimum field strength exists within said dielectric between said electrodes; means for mounting said rotor so that its peripheral surface moves tangentially relative to a surface of said electrodes; means for applying charges of a predetermined polarity to said rotor at one of said electrodes; and means for removing said charges from said rotor at another electrode, the construction and arrangement of the parts being such that the space between the nearest points on said high voltage inductor and an element of low potential is substantially equal to the product of a cross sectional dimension of said high voltage inductor and 1.60.

References Cited by the Examiner

UNITED STATES PATENTS

| | | | |
|---|---|---|---|
| 2,785,320 | 3/1957 | Morel | 310—6 |
| 2,831,988 | 4/1958 | Morel | 310—6 |
| 2,836,785 | 5/1958 | Neubert | 310—6 |
| 2,860,264 | 11/1958 | Felici | 310—6 |

FOREIGN PATENTS

| | | |
|---|---|---|
| 571,213 | 2/1959 | Canada. |
| 766,054 | 3/1955 | Great Britain. |

MILTON O. HIRSHFIELD, *Primary Examiner.*